J. L. True,

Potato Planter,

N° 46,281.    Patented Feb. 7, 1865.

Witnesses:

Inventor:

UNITED STATES PATENT OFFICE.

JOSEPH L. TRUE, OF GARLAND, MAINE.

IMPROVED MACHINE FOR PLANTING POTATOES.

Specification forming part of Letters Patent No. 46,281, dated February 7, 1865.

*To all whom it may concern:*

Be it known that I, JOSEPH L. TRUE, of Garland, in the county of Penobscot and State of Maine, have invented a new and Improved Machine for Planting Potatoes; and I do hereby declare that the following is a full, clear, and exact description thereof, which will enable others skilled in the art to make and use the same, reference being had to the accompanying drawings, forming part of this specification, in which—

Figure 1:
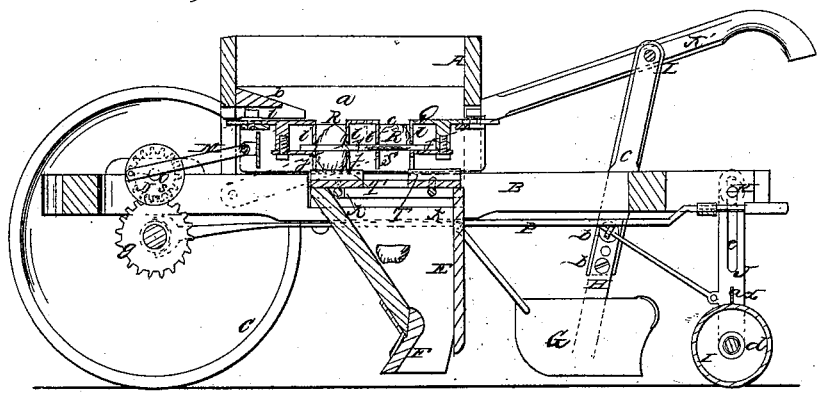
Figure 2:
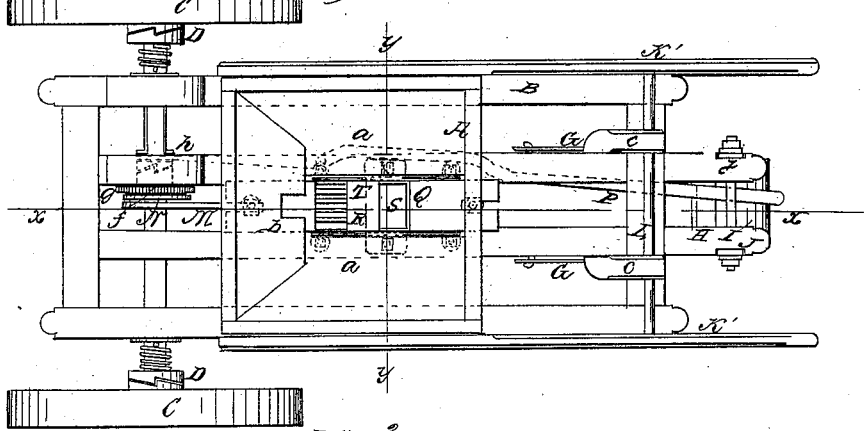
Figure 3:
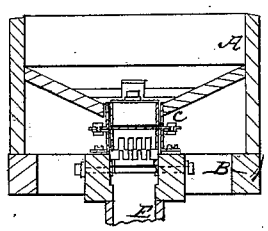

Figure 1 is a side sectional view of my invention, taken in the line $x$ $x$, Fig. 2; Fig. 2, a plan or top view of the same; Fig. 3, a transverse vertical section of the same, taken in the line $y$ $y$, Fig. 2.

Similar letters of reference indicate like parts.

This invention relates to a new and improved machine for planting potatoes; and it consists in a novel arrangement of parts, as hereinafter fully shown and described, whereby the potatoes may be cut or not, as desired, planted either in hills or drills, different quantities of seed discharged at regular intervals, as may be required, and the machine rendered capable of being manipulated or worked with the greatest facility, and adapted for use on various kinds of ground, rough or smooth, mellow and pliable, or hard and clayey.

A represents a hopper, the interior of which may be of rectangular form, and provided with a bottom composed of three inclined planes, $a$ $a$ $b$, two of which, $a$ $a$, extend or incline downward from the sides toward the center, and the other, $b$, extending downward from the front end of the hopper, a rectangular opening, $c$, being allowed at the lower edges of said inclined planes. This hopper A is placed on a frame, B, of rectangular form, the front part of which is mounted on two wheels, C C, the latter being placed loosely on their axle, and arranged with catches D, so as to be connected with the axle and turn it when the machine is being drawn forward, and disconnected from the axle, so as not to turn it, when the machine is "backed." This is a feature, however, common to many agricultural machines which are mounted on wheels.

E represents a seed-conveying tube, which depends from the center of the frame B, and has a furrow-share, F, secured to its lower end; and G G are two covering-shares, which are attached to bars H, the latter being secured by screws $b$ into the lower ends of bars $c$ $c$, attached to frame B. By this mode of attachment the shares G G may be readily adjusted higher or lower, as desired. (See Fig. 1.) These shares cover the seed or potatoes dropped into the furrow made by the share F.

I is a roller, the shaft or axis $d$ of which has its bearings in the lower parts of vertical bars J J, attached one to each side of the rear part of the frame B. These bars J J are slotted vertically at their upper parts, as shown at $e$, and a bolt, K, passes through these slots and through the frame B. By this means it will be seen that the rear part of the frame B may be adjusted higher or lower, as occasion may require. This roller keeps the shares F and G G at a uniform depth, and by adjusting the rear of the frame B, as previously referred to, the potatoes may be planted at a greater or less depth, as may be desired. A scraper, $a^x$, is placed between the bars.

K' K' are handles, which are attached to the frame B in an inclined position, one at each side, and are supported in proper position by a cross-rod, L, which passes through the upper parts of the bars $c$ $c$.

By the arrangement of the parts above described it will be seen that the machine may be manipulated with the greatest facility, equally so as an ordinary plow, the shares, by pulling upward on the handles K' K', being easily lifted over obstructions.

M is a pitman, the front end of which is attached to a crank-wheel, N, on a shaft, O, above the axles of the wheels C C, and on this shaft there is a pinion, $f$, which gears into a toothed wheel, $g$, on the axle of the wheels C. This wheel $g$ is placed loosely on said axle, but is connected to it, when desired, by means of a clutch, $h$, operated by a lever, P. This pitman M is connected to a slide, Q, which is fitted and works between guide-plates $h'$ $h'$ on the frame B, said slide being directly under or in line with the opening in the hopper. The slide Q is constructed in such a manner that it will have two boxes, R R, to receive the potatoes from the hopper. The partitions $i$, which form said boxes, have horizontal slots or openings $j$ in them; and S is a knife which extends across or through the boxes of the slide in line with the slots or openings $j$. This knife S is fixed or stationary, and is secured at its ends to the plates h' h'. This slide Q is provided with bottom plates, T T, which may be adjusted higher or lower by means of set-screws k. (Shown clearly in Fig. 1.) The boxes R R of the slide carry the potatoes to the knife S as the slide moves forward and backward, the potatoes being carried to the knife above and below it, as shown in Fig. 1, and a sufficient space is allowed between the bottom plates, T T, for the cut potatoes to pass out into the tube E. The boxes R R may be increased or diminished in size by moving the outer partitions of the boxes, the latter being secured in position by the screws l.

By adjusting the bottom plates, T T, higher or lower the potatoes may be cut into larger or smaller pieces, as may be desired. The pieces cut from the lower parts of the potatoes are dropped directly into tube E, while the other portion remains on knife S until it is shoved off by the backward or reverse movement of the slide, when it drops on the bottom plate, and is carried under the knife at the next forward movement of the slide. In the meantime the potato in the other box is carried to the knife and acted upon as the first one, and so on, each box in its turn carrying a potato to the knife until the hopper is emptied.

In case the potatoes do not require to be cut the knife S is removed.

Having thus described my invention, I claim as new and desire to secure by Letters Patent—

1. A reciprocating slide provided with one or two boxes, and arranged in relation with bottom plates, one or more, to operate in the manner substantially as and for the purpose herein set forth.

2. A horizontal stationary cutter or knife arranged with a reciprocating slide and boxes, to operate substantially as and for the purpose specified.

3. The placing of the cutter or knife in such a relative position with the sliding boxes that the latter will feed or convey the potatoes to the former both above and below it, as set forth.

4. The furrow-share F at the bottom of the seed-conveying tube E, the covering-shares G G, and roller I, when used in combination with the potato-dropping device, substantially as and for the purpose herein set forth.

JOSEPH L. TRUE.

Witnesses:
   LYNDON OAK,
   LORENZO OAK.